(12) United States Patent
Kido

(10) Patent No.: US 7,409,382 B2
(45) Date of Patent: Aug. 5, 2008

(54) INFORMATION PROCESSING SYSTEM, TERMINAL DEVICE, METHOD AND MEDIUM

(75) Inventor: Toshiharu Kido, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 24 days.

(21) Appl. No.: 09/864,260

(22) Filed: May 25, 2001

(65) Prior Publication Data

US 2002/0073081 A1  Jun. 13, 2002

(30) Foreign Application Priority Data

Dec. 8, 2000  (JP) .............................. 2000-374801

(51) Int. Cl.
*G06F 17/30* (2006.01)
(52) U.S. Cl. ................................ 707/3; 707/1; 707/102
(58) Field of Classification Search ............. 707/1–10, 707/100–104.1, 200–205, 501.1, 510–513; 709/203–240; 725/1–10, 38, 32, 110–112, 725/40–45, 50–53, 34–35, 61, 86, 114–115, 725/39; 348/14, 569, 734; 705/26–30, 14–15; 345/738–740, 326–328, 340, 969; 715/501.1, 715/512–513; 386/83, 465, 473
See application file for complete search history.

(56) References Cited

U.S. PATENT DOCUMENTS

| | | | | |
|---|---|---|---|---|
| 5,652,613 A * | 7/1997 | Lazarus et al. | ................ | 725/50 |
| 5,809,512 A * | 9/1998 | Kato | .......................... | 715/502 |
| 5,902,115 A * | 5/1999 | Katayama | ............... | 434/307 A |
| 5,905,988 A | 5/1999 | Schwartz et al. | ............ | 707/104 |
| 5,917,481 A * | 6/1999 | Rzeszewski et al. | ........ | 715/721 |
| 6,025,837 A * | 2/2000 | Matthews et al. | ........... | 715/721 |
| 6,035,304 A * | 3/2000 | Machida et al. | .......... | 707/104.1 |
| 6,081,263 A * | 6/2000 | LeGall et al. | ............... | 715/760 |
| 6,081,840 A * | 6/2000 | Zhao | .......................... | 709/224 |
| 6,085,565 A * | 7/2000 | Suda et al. | .................... | 72/224 |
| 6,122,631 A * | 9/2000 | Berbec et al. | .................. | 707/9 |
| 6,141,759 A * | 10/2000 | Braddy | ....................... | 713/201 |
| 6,163,316 A * | 12/2000 | Killian | ........................ | 345/721 |
| 6,177,931 B1 * | 1/2001 | Alexander et al. | ............ | 725/52 |

(Continued)

FOREIGN PATENT DOCUMENTS

EP           0971296 A2      1/2000

(Continued)

OTHER PUBLICATIONS

Aseel Ibrahim et al., Multimodal Dialogue systems for interactive TV applications, publishing date unknown, pp. 1-6.*

(Continued)

*Primary Examiner*—Cheryl Lewis
(74) *Attorney, Agent, or Firm*—Staas & Halsey LLP

(57) ABSTRACT

A technology provides a function capable of passively utilizing a multiplicity of contents on networks. An information processing system includes a storage unit storing information, and a control unit. The control unit searches locating information for locating where data exists, and judges whether or not the data located by the locating information comes under a predetermined category. When the data is judged to come under the predetermined category, the storage unit stores the locating information and collects pieces of locating information for locating where the data exist.

49 Claims, 13 Drawing Sheets

U.S. PATENT DOCUMENTS

| | | | |
|---|---|---|---|
| 6,188,650 B1 * | 2/2001 | Hamada et al. | 369/30.36 |
| 6,216,265 B1 * | 4/2001 | Roop et al. | 725/54 |
| 6,237,011 B1 * | 5/2001 | Ferguson et al. | 715/515 |
| 6,312,336 B1 * | 11/2001 | Handelman et al. | 463/40 |
| 6,345,256 B1 * | 2/2002 | Milsted et al. | 705/1 |
| 6,351,467 B1 * | 2/2002 | Dillon | 370/432 |
| 6,374,260 B1 * | 4/2002 | Hoffert et al. | 707/104.1 |
| 6,460,181 B1 * | 10/2002 | Donnelly | 725/50 |
| 6,486,892 B1 * | 11/2002 | Stern | 345/760 |
| 6,519,564 B1 * | 2/2003 | Hoffberg et al. | 704/270.1 |
| 6,519,585 B1 * | 2/2003 | Kohli | 707/3 |
| 6,526,424 B2 * | 2/2003 | Kanno et al. | 715/512 |
| 6,643,641 B1 * | 11/2003 | Snyder | 707/4 |
| 6,816,868 B1 * | 11/2004 | Shimizu | 707/102 |
| 6,832,220 B1 * | 12/2004 | Rahman | 707/5 |
| 6,847,977 B2 * | 1/2005 | Abajian | 707/102 |
| 6,859,799 B1 * | 2/2005 | Yuen | 707/3 |
| 6,907,189 B2 * | 6/2005 | Ko et al. | 386/96 |
| 7,058,635 B1 * | 6/2006 | Shah-Nazaroff et al. | 707/100 |
| 2001/0014976 A1 * | 8/2001 | Roop et al. | 725/91 |
| 2001/0024565 A1 * | 9/2001 | Yui et al. | 386/83 |
| 2002/0099731 A1 * | 7/2002 | Abajian | 707/500 |
| 2003/0210896 A1 * | 11/2003 | Matsuno et al. | 386/95 |
| 2004/0220902 A1 * | 11/2004 | Gates et al. | 707/3 |

FOREIGN PATENT DOCUMENTS

| | | | |
|---|---|---|---|
| JP | 5-108435 | | 4/1993 |
| JP | 6-124186 | | 5/1994 |
| JP | 09081444 | A | 3/1997 |
| JP | 9-190446 | | 7/1997 |
| JP | 9-311869 | | 12/1997 |
| JP | 11296274 | A | 10/1999 |
| JP | 11341449 | A | 12/1999 |
| JP | 2000-112975 | | 4/2000 |
| WO | WO 98/43183 | * | 10/1998 ........ 17/30 |
| WO | WO 00/26762 | * | 5/2000 ........ 15/16 |
| WO | WO 01/03000 A2 | * | 1/2001 ........ 17/30 |

OTHER PUBLICATIONS

Andrew McCallum et al. "building domain-specific search engines with machine learning techniues", Proc.AAAI-99 spring symposium on intelligent agents in cyberspace, 1999, 12 pages.*

George D Magoulas et al. "a personalised interface for web directories based on cognitive styles" LNCS 3196,2004, pp. 159-166.*

Patrick Baudisch et al. "TV Scout: guiding users from printed TV Program guides to personalized TV recommendation",in proceedings of TV02 2nd workshop on personalization in future TV 2002.*

M Van Setten et al. "Designing personalized information systems-a personal media center", no date.*

Srinivas Gutta et al. "TV content recommender system", American association for artifical intelligence, 2000 2 pages.*

Dobbie,W., "Interactive electornic programme guides", Navigation in entertainment srvices Jan. 16, 1998, 5 pages.*

Janet Greco, "data preparation for iterative electronic program guides", international broadcasting convention, Sep. 1996,pp. 294-297.*

Communication from the European Patent Office including a European Search Report mailed May 22, 2002, 6 pages only.

A. Lippman et al., "Media Banks: Entertainment And The Internet," IBM Systems Journal, vol. 35, Nos. 3&4, 1996, pp. 272-291.

Wen-Syan Li et al., "WebDB: A Web Query System And Its Modeling, Language, And Implementation," Research And Technology Advances In Digital Libraries, Apr. 22, 1998, pp. 216-227.

K. Nygren et al., "An Agent System For Media On Demand Services, Proceedings Of The International Conference On The Practical Application Of The Intelligent Agents And Multi-Agent Technology," Apr. 22, 1996, pp. 437-454.

"Newsweek Names Friskit One of Five New Technologies That Could Change Your Life," Friskit Press Room, Online, Nov. 28, 2000 (2 pages).

* cited by examiner

FIG. 4

```
EPG WORLD

WHICH CATEGORY OF DATA DO YOU DESIRE FOR ?
      ○ SOUND
      ○ ANIMATED IMAGE
      ○ STILL IMAGE
      ○ TEXT
      ○ UNSPECIFIED

WHAT IS GENRE ?
      ○ NEWS
      ○ MOVIE
      ○ MUSIC
      ○ UNSPECIFIED

IS KEYWORD SPECIFIED ?
      ○ SPECIFIED  [          ]
      ○ UNSPECIFIED

[ CREATION ]
```

FIG.6

| ITEM NUMBER | SERVER URL | SITE TITLE NAME | CONTENT GENRE | MAIN DATA CATEGORY |
|---|---|---|---|---|
| 00001 | http://www···.. | NEWS TODAY | NEWS | SOUND |

FIG. 7

| EXTENSION | DATA CATEGORY | FORMAT |
|---|---|---|
| .au | SOUND | AU ($\mu$-law) |
| .snd | SOUND | AU |
| .snd | SOUND | Macintosh "snd" |
| .aif | SOUND | AIFF |
| .aiff | SOUND | AIFF |
| .wav | SOUND | WAVE |
| .mp3 | SOUND | MP3 |
| .mpeg | ANIMATED IAMGE | MPEG |
| .mpg | ANIMATED IAMGE | MPEG |
| .qt | ANIMATED IAMGE | Quicktime |
| .mov | ANIMATED IAMGE | Quicktime |
| .avi | ANIMATED IAMGE | Video for Windows |
| .jpg | STILL IMAGE | JPEG |
| .tif | STILL IMAGE | TIFF |
| .xbm | STILL IMAGE | XBM |
| .pdf | STILL IMAGE | PDF |
| .pcx | STILL IMAGE | PCX |
| .pct | STILL IMAGE | PICT |
| .txt | TEXT | PLAIN TEXT |
| .html | DOCUMENT | html |
| .xml | DOCUMENT | xml |
| .doc | DOCUMENT | ADAPTED TO APPLICATION |
| .jtd | DOCUMENT | ADAPTED TO APPLICATION |

INFORMATION PROCESSING SYSTEM, TERMINAL DEVICE, METHOD AND MEDIUM

BACKGROUND OF THE INVENTION

The present invention relates to an information processing system and an information collecting method of collecting pieces of information related to contents on a network, and also to a computer program.

With developments of computers and communication technologies, users become able to access a variety of resources in a network such as the Internet etc. The contents in a variety of categories such as animated images (motion pictures), sounds (including music data and vocal sounds), still images (still pictures), character data and soon, are provided on the network.

Further, a majority of terminal devices come to connect to the network at all times owing to a reduction in communication charges. Under such an environment, there arises a desire for utilizing the contents on the network as by the conventional TV and radio. This is because the animated images and sounds on the network contain the same categories of contents as those provided by TV programs and radio programs.

The TV and radio, however, upon switch-on and predetermined settings, provide the contents in accordance with a program schedule without any active operation of a user. While on the other hand, the user, when accessing the contents on the network, needs the active operation.

Namely, the user, before utilizing the contents on the network, must trace the information on the network by an interactive operation. Therefore, even though the computers and networks have widely spread, the user is unable to simply passively utilize the contents on the network as by the TV and radio.

SUMMARY OF THE INVENTION

It is a primary object of the present invention, which was devised to obviate the problems inherent in the prior art, to provide a function capable of simply passively utilizing a multiplicity of contents on a network.

To accomplish the above object, according to a first aspect of the present invention, an information processing system (1, 11) comprises a storage unit (3, 4, 13, 14) for storing information, and a control unit (2, 12), wherein the control unit (2, 12) searches locating information for locating where data exists, and judges whether or not the data located by the locating information comes under a predetermined category, and the storage unit (3, 4, 13, 14), when the data is judged to come under the predetermined category, stores the locating information to collect pieces of locating information for locating where the data exist.

Preferably, the information processing system (1, 11) may further comprise a communication unit (8, 18)for accessing a network, ora communication connection module (8a, 18a) through which the communication unit is connected, wherein the control unit (2, 12) may search the locating information retained in other information processing system on the network.

Preferably, the communication unit (8, 18) may receive a selection criterion for selecting the data, and the control unit (2, 12) may judge whether or not the data is coincident with the selection criterion and collects pieces of locating information tracing to the data coincident with the selection criterion.

Preferably, the information processing system (1, 11) may further comprise an input unit, wherein the input unit may receive an input of the selection criterion for selecting the data, and the control unit may judge whether or not the data is coincident with the selection criterion and collect pieces of locating information tracing to the data coincident with the selection criterion.

Preferably, the communication unit (18) may receive a request for collecting the locating information from a terminal device (1) connected to the network, and the control unit may get the collected locating information displayed on the terminal device (1).

Preferably, the information processing system (1, 11) may further comprise a display unit (5, 15)for displaying the information, or a first connection module (5a, 15a) through which the display unit is connected, wherein the control unit (2, 12) may get the collected locating information displayed on the display unit (5, 15).

Preferably, the control unit (2, 12) may search character information related to the data, and may get the character information displayed in a way of being combined with the locating information.

Preferably, categories of the data may be still image data, sound data, animated image data, text data, or combinations thereof. Herein, the sound data contain music data, vocal sounds and other kind of sounds.

Preferably, the information processing system (1,11) may further comprise an input unit (6, 7, 17, 17), a display unit (5, 15) for displaying information, or a first connection module (5a, 15a) through which the display unit (5, 15) is connected, and a sound output unit (9b and 9c) for outputting sounds, or a second connection module (9a) through which the sound output unit (9b and 9c) is connected, wherein the input unit (6, 7, 16, 17) is commanded to output the data, and the control unit (2, 12) may get the content described by the data outputted. Herein, the outputting of the content implies reproducing the animated images and the sounds (containing the music data, vocal sounds and other kind of sounds) and displaying the still images and the text information.

According to a second aspect of the present invention, a terminal device (1) comprises a communication unit (8) for accessing a network, or a communication connection module (8a) through which the communication unit is connected, and a control unit (2), wherein the control unit (8) requests a server (11) on the network to collect pieces of locating information for locating where data exist, the data located by the locating information coming under a predetermined category, thus collecting the locating information.

Preferably, the terminal device (1) may further comprise a display unit (5) for displaying the information, or a first connection module (5a) through which the display unit is connected, wherein the control unit (2) may get the collected locating information displayed on the display unit (5).

Preferably, the terminal device (1) may further comprise an input unit (6, 7), a display unit (5) for displaying information, or a first connection module (5a) through which the display unit is connected, and a sound output unit (9b, 9c) for outputting sounds, or a second connection module (9a) through which the sound output unit (9b, 9c) is connected, wherein the input unit (6, 7) may be commanded to output the data, and the control unit (2) may get the content described by the data outputted to the display unit or the sound output unit.

The control unit may get a plurality of contents consecutively outputted, which are located by plural pieces of locating information collected.

According to a third aspect of the present invention, a system comprises a search unit (2) for searching content data corresponding to predetermined conditions, a sequence determining unit (2) for determining a sequence of reproducing the content data searched, and a reproduction control unit (2) for controlling the reproduction of the content data in accordance with the reproducing sequence.

Preferably, the content data may be retained in other system accessible via a network.

Preferably, the predetermined condition may be specified by a user.

Preferably, the predetermined condition may be to specify a specific genre of the content.

Preferably, the predetermined condition may be to specify a specific data category.

Preferably, the content data may be stream data.

According to a fourth aspect of the present invention, a method of collecting locating information for indicating a location of data, comprises a step (S31, S32) of searching locating information for locating where data exists, a step (S34) of judging whether or not the data comes under a predetermined category, and a step (S36) of storing, when judging that the data comes under the predetermined category, the locating information.

According to a fifth aspect of the present invention, a method comprises a step (S31-S35) of searching content data coincident with a predetermined condition, a step (S36) of determining a sequence of reproducing the content data searched, and a step (S100-S111) of controlling the reproduction of the content data in accordance with the reproducing sequence. According to a sixth aspect of the present invention, there is provided a readable-by-computer recording medium recorded with a program executed by a computer to actualize any one of the functions described above.

As explained above, according to the present invention, a multiplicity of contents on the network can be simply passively utilized.

BRIEF DESCRIPTION OF THE DRAWINGS

FIG. 4 is a diagram showing an example of an EPG creation request;

FIG. 6 is a diagram showing an example of a data structure of an orientation database 21;

FIG. 7 is a diagram showing an example of a data structure of a content judgement table;

DETAILED DESCRIPTION OF THE PREFERRED EMBODIMENTS

Preferred Embodiments of the present invention will hereinafter be described with reference to the accompanying drawings.

First Embodiment

Figure 1:
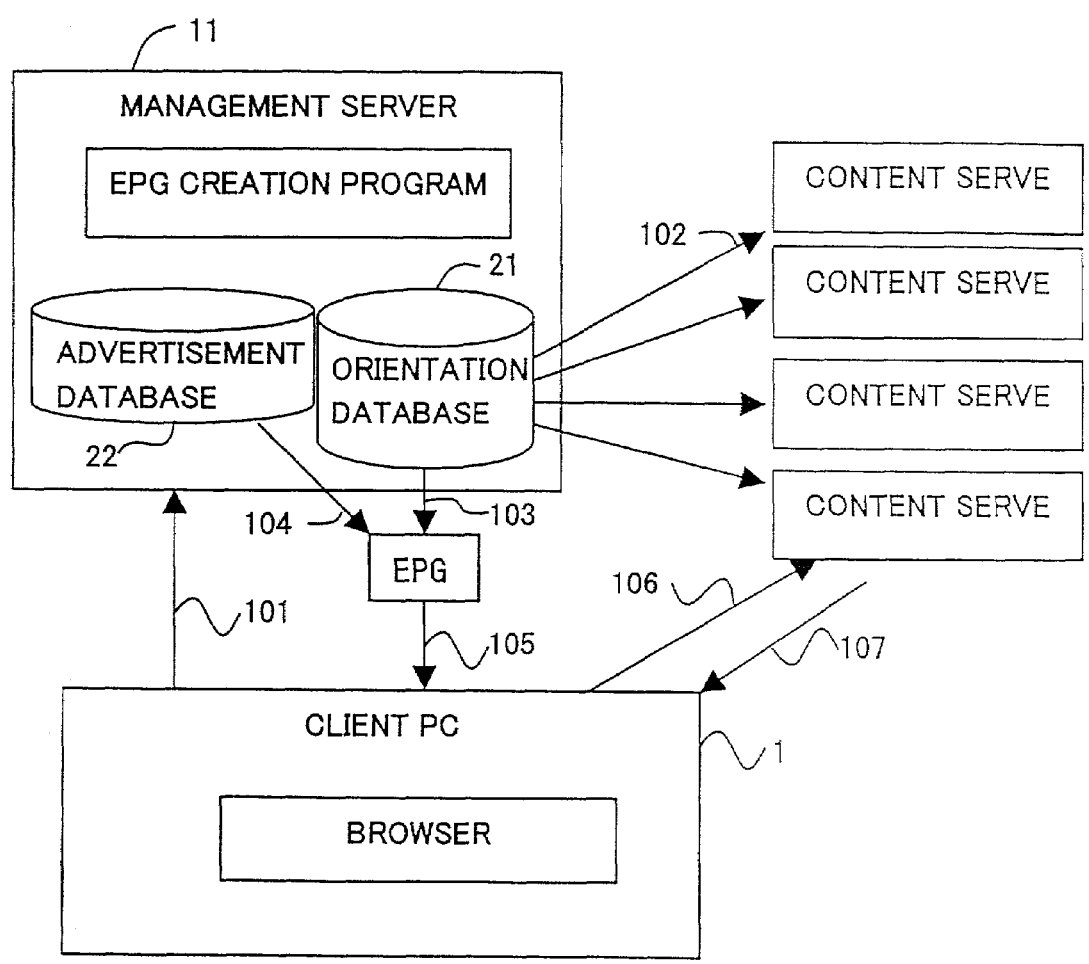
FIG. 1 is a diagram showing an outline of system architecture of an information search system in a first embodiment.
Figure 2:
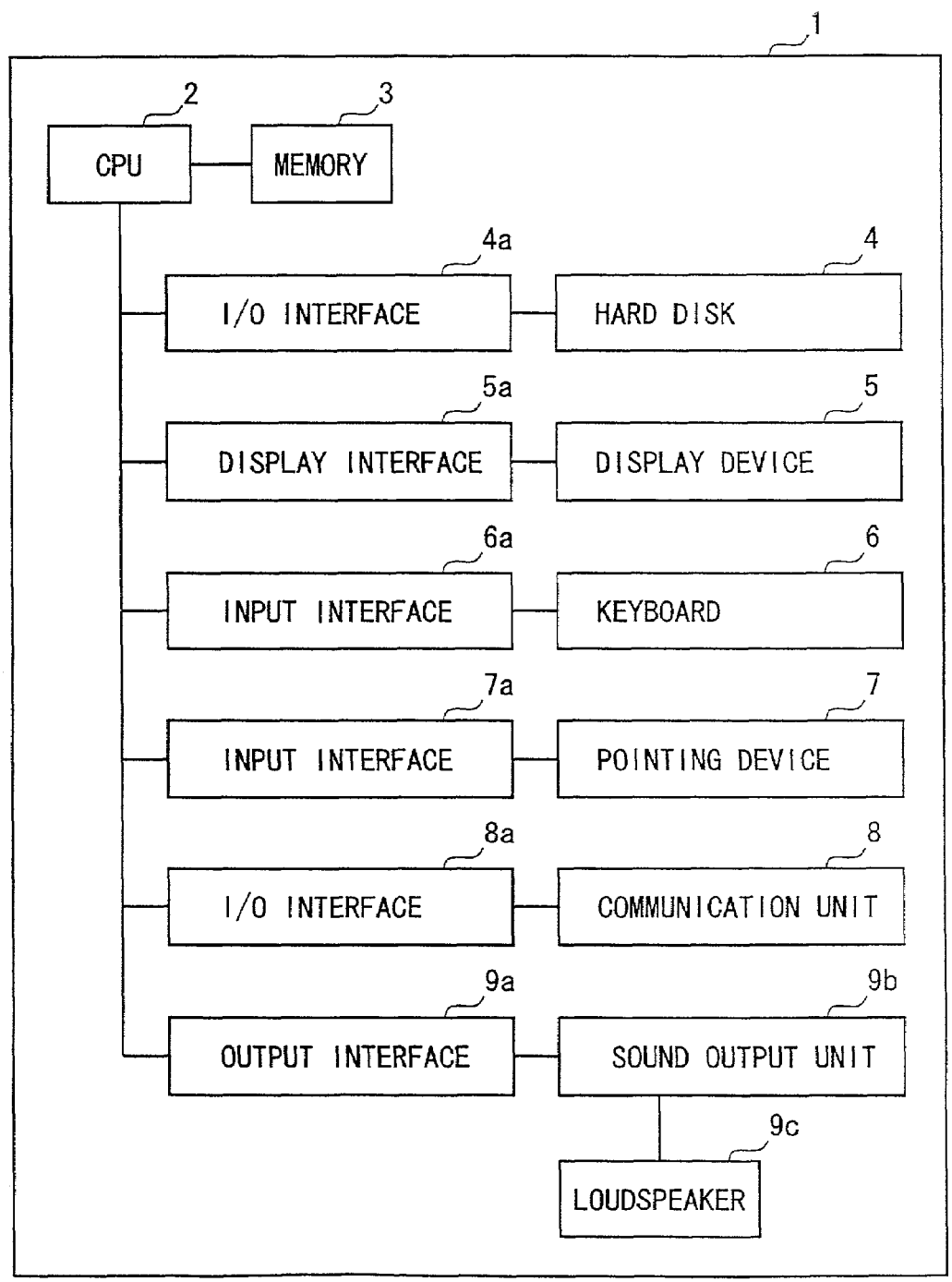
FIG. 2 is a diagram showing a hardware architecture of a PC 1.
Figure 3:
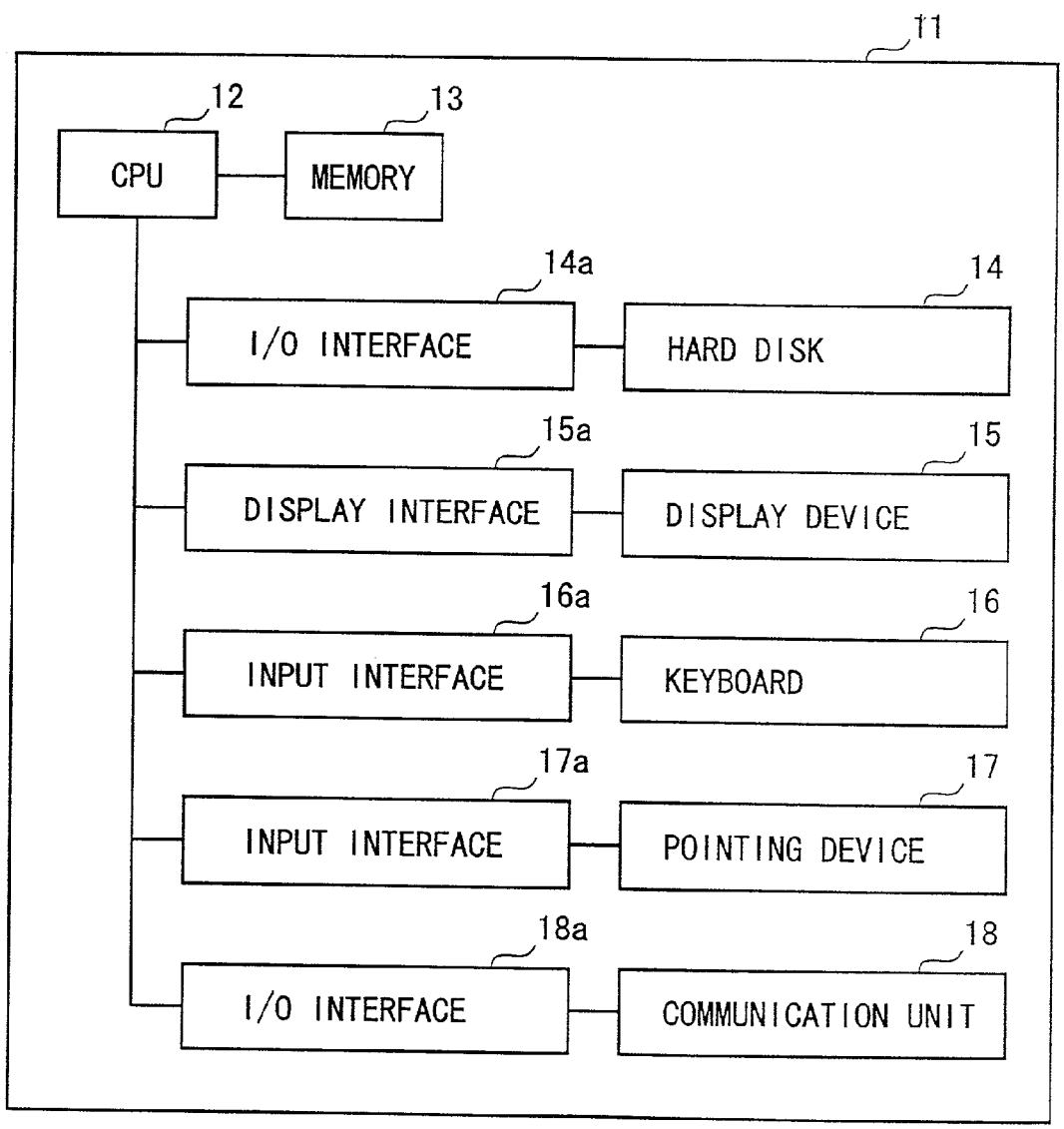
FIG. 3 is a diagram showing a hardware architecture of a management server 11.
Figure 5:
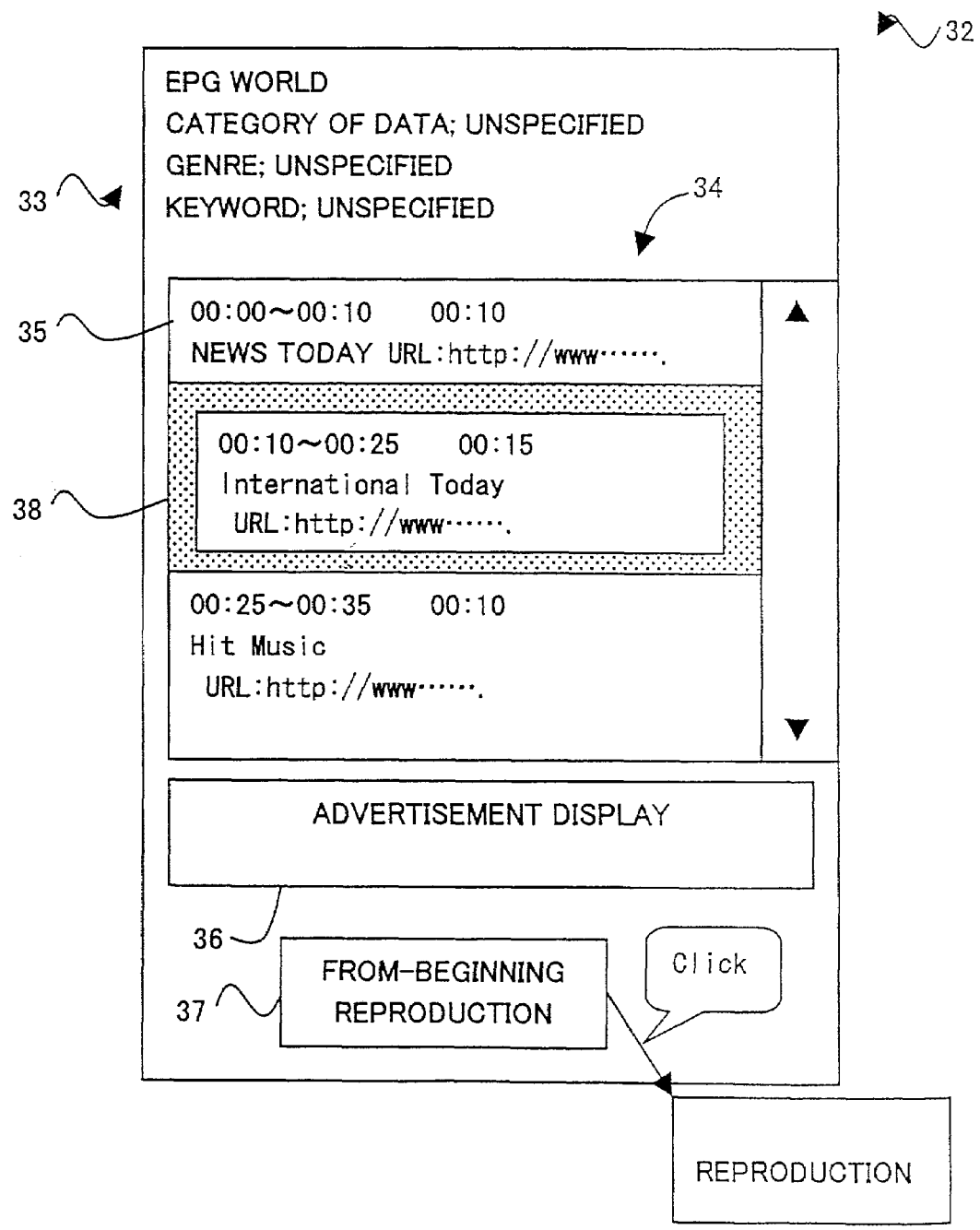
FIG. 5 is a diagram showing an example of an EPG display screen on the PC 1.
Figure 8:
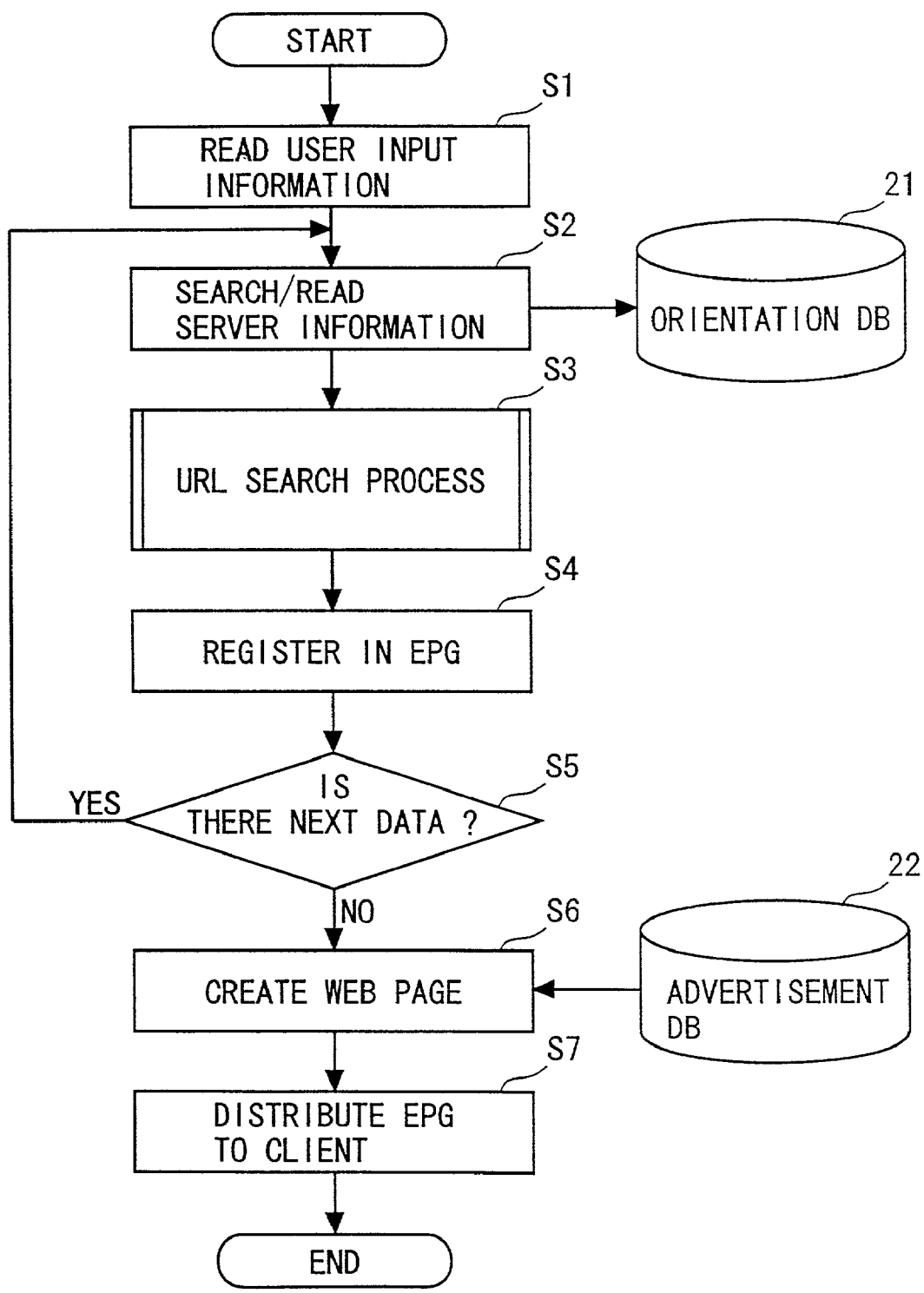
FIG. 8 is a flowchart showing processes of an EPG creation program in the first embodiment.
Figure 9:
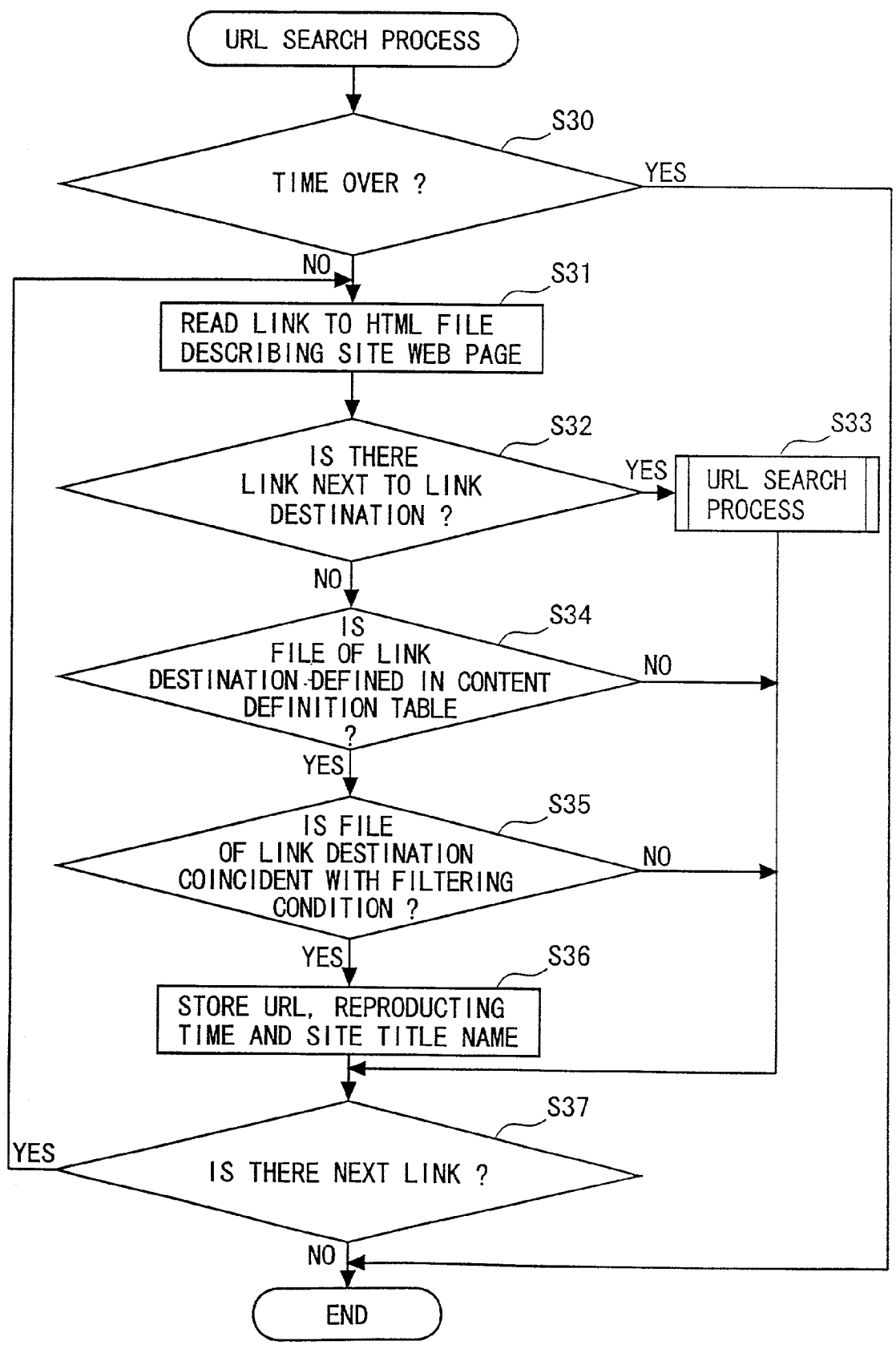
FIG. 9 is a flowchart showing details of a URL search process.
Figure 10:
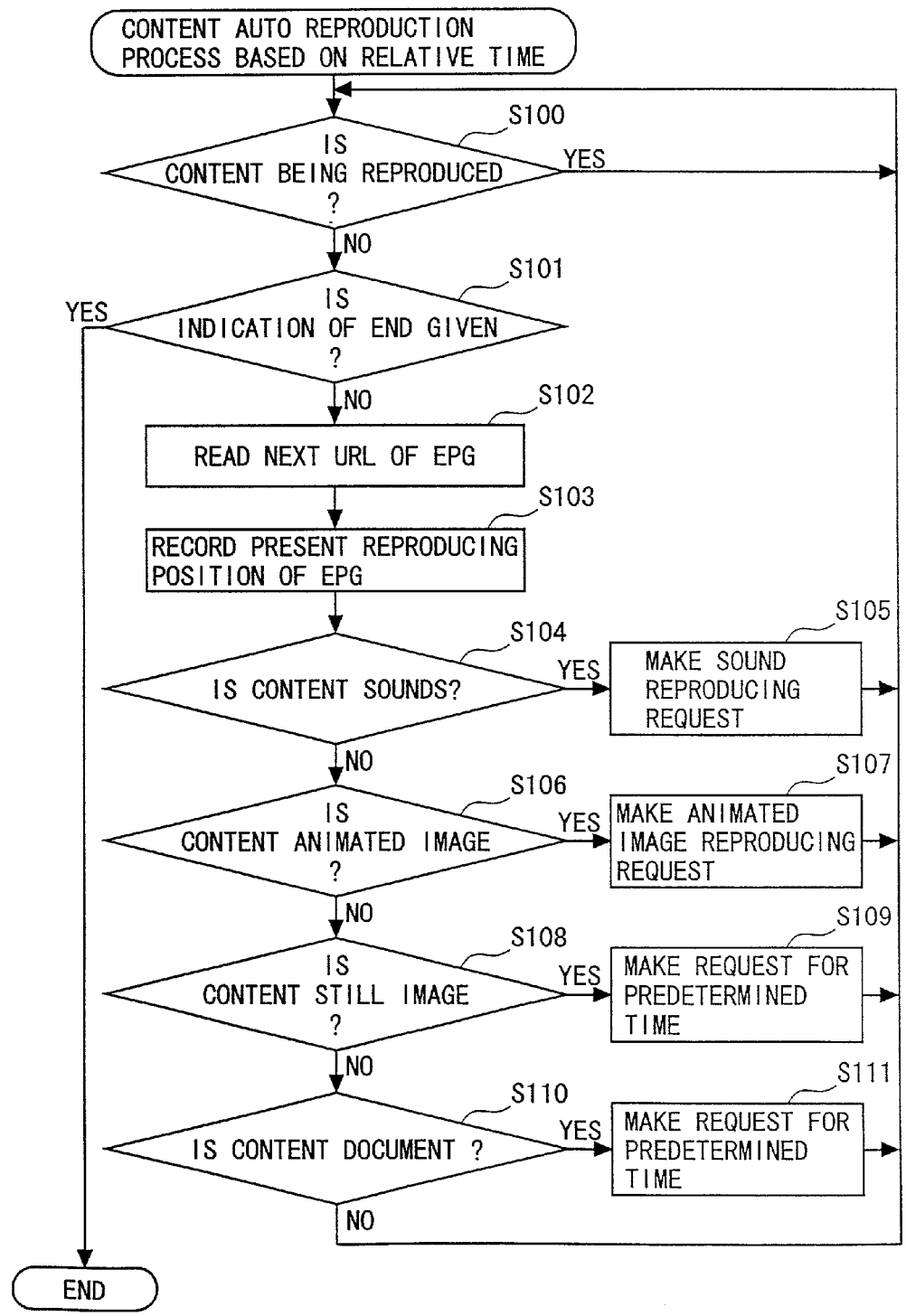
FIG. 10 is a flowchart showing a content auto reproduction process based on a relative time.
Figure 11:
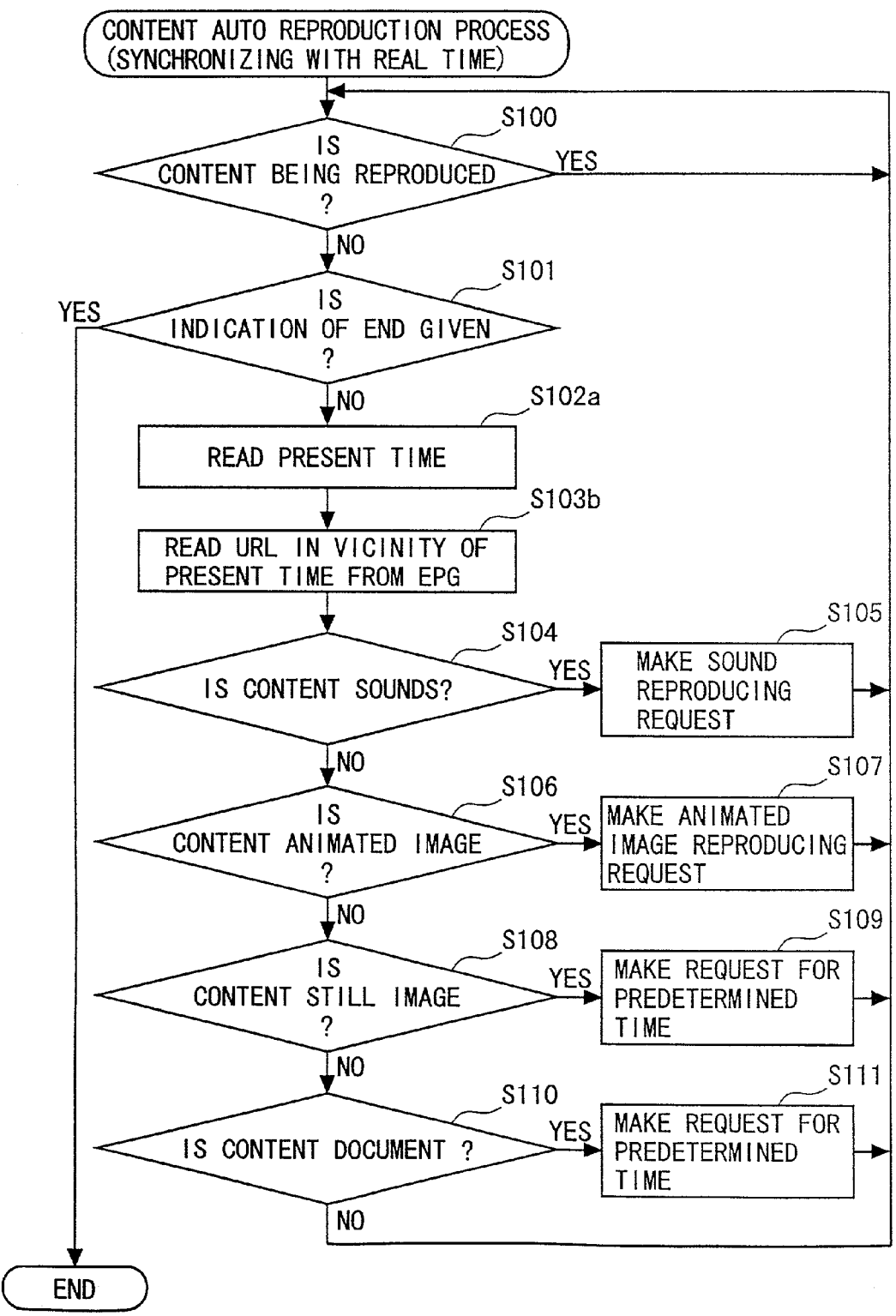
FIG. 11 is a flowchart showing the content auto reproduction process synchronizing with a real time.

A first embodiment of the present invention will hereinafter be discussed referring to FIGS. 1 through 11. FIG. 1 is a diagram showing an outline of a system architecture of an information search system in the first embodiment. FIG. 2 is a diagram showing a hardware architecture of a personal computer 1 (which will hereinafter abbreviated to PC 1) defined as a client. FIG. 3 is a diagram showing a hardware architecture of a management server 11 shown in FIG. 1. FIG. 4 shows an example of an EPG (Electronic Program Guide) creation request screen 31 on the PC 1. FIG. 5 shows an example of an EPG display screen 32 on the PC 1. FIG. 6 shows an example of data structure of an orientation database 21 shown in FIG. 1. FIG. 7 shows an example of data structure of a content judgement table to which the management server 11 refers. FIG. 8 is a flowchart showing processes of an EPG creation program executed by the management server 1 shown in FIG. 1. FIG. 9 is a flowchart showing details of an URL search process shown in FIG. 8. FIG. 10 is a flowchart showing a content auto reproducing process on a relative time basis. FIG. 11 is a flowchart showing the content auto reproducing process synchronizing with a real time.

<Outline of System Architecture>

FIG. 1 is the diagram showing the system architecture of the information search system. This information search system is configured by content servers for providing contents, the management server 11 for creating an EPG by searching information in the self-database as well as in the content servers, and the PC 1 that accesses the management server 11 and the content serves via a network.

The management server 11 in this information search system searches a variety of contents existing on the computers in the Internet such as animated images (moving pictures), sounds, still images (still pictures), texts or composite data thereof, thereby automatically creating a content list. Herein, the sounds contain music data, vocal sounds and other kind of sounds (this terminology will hereinafter be applied the same as the above).

In the first embodiment, this content list may be defined as the EPG. The management server 11 executes the EPG creation program for creating the EPG. In this EPG creation process, the management server 11, based on a keyword and a category specified by a user, collects the contents related to this specification, thus creating the EPG.

Further, the management server 11 includes the orientation database 21, an advertisement database 22, and an unillustrated content database. The orientation database 21 contains data indicating categories of the contents provided by the content servers and the management server 11. The management server 11 searches the orientation database 21 and, based on this searched result, further searches the information in the content servers and the management server 11 itself.

The PC 1 in the present information search system executes (boots) a browser and automatically reproduces the contents on the basis of the EPG. Of these contents especially the animated images, the sounds and the composite data thereof are called stream data. A function of reproducing the stream data is actualized by a program incorporated into the browser.

The stream data may be defined as on-demand data, i.e., the data of such a type as to be downloaded when in the reproducing process. The browser provides, in addition to a function of consecutively reproducing the contents based on the EPG, a function of individually reproducing the EPG content specified by the user.

An outline of processing in the system will hereinafter be described with reference to FIG. 1. To start with, the client such as the PC 1 etc requests the management server 11 to create the EPG (as indicated by an arrowhead 101). At this time, the PC 1 transfers the category desired by the user and the keyword to the management server 11.

The management server 11, based on the orientation database 21, searches the management server 11 itself and HTML files held by the content servers in the network (as indicated by an arrowhead 102). The management server 11 collects URLs (Uniform Resource Locators) for locating the contents from those HTML files.

Next, the management server 11 sorts out the collected URLs as a list and creates the EPG (as indicated by an arrowhead 103). Further, the management server 11 selects a predetermined item of advertisement data from the advertisement database 22, and adds a URL locating this item of advertisement data to the EPG (an arrowhead 104). The EPG created is distributed to the PC 1 (an arrowhead 105).

The client such as the PC 1 requests the content server to distribute the content concerned in accordance with the URL described in the EPG (an arrowhead 106). The content server having received the request distributes that content to the client such as the PC 1 (an arrowhead 107).

<Hardware Architecture>

FIG. 2 is the diagram showing the hardware architecture of the PC 1. The PC1 includes a CPU 2 for executing the programs, a memory 3 for storing the programs executed by the CPU 2 and data processed by the CPU 2, peripheral devices such as a hard disk 4 for recording the programs and the data, a display device 5 for displaying information such as menus, icons, messages etc, a keyboard 6 for inputting character data, a pointing device 7 for manipulating the menus and the icons on the display device 5, a communication unit 8 for accessing the network and a sound output unit 9b for outputting the sounds to a loudspeaker 9c, and a variety of interfaces for connecting these peripheral devices to the CPU 2.

The CPU 2 executes the programs stored in the memory 3, thereby providing a function as the client.

The memory 3 stores the programs executed by the CPU 2 and the data processed by the CPU 2.

The hard disk 4 is recorded with the programs executed by the CPU 2 and the data processed by the CPU 2. The hard disk 4 is connected via an I/O interface 4a to the CPU 2.

The display device 5 displays the information, the menu, the icon and the message that are inputted by the user, the EPG distributed by the management server 11, and the contents provided by the content servers. The display device 5 may be one of, e.g., a CRT, a liquid crystal display, a PDP (Plasma Display Panel), an EL (Electro Luminescence) panel, a FED (Field Emission Display) etc. The display device 5 is connected via a display interface 5a to the CPU 2.

The keyboard 6 is used for inputting the character data. The keyboard 6 is connected via an input interface 6a to the CPU 2.

The pointing device 7 is used for manipulating the menus and the icons displayed on the display device 5. The pointing device 7 may be one of, e.g., a mouse, a trackball, a joystick, an electrostatic touch panel, a stick-shaped pointing device, an optical pointing device and a touch panel. The pointing device 7 is connected via an input interface 7a to the CPU 2.

The communication unit 8 accesses the network in accordance with a command from the CPU 2, and communicates with other host on the network. The communication unit 8 is connected via an I/O interface 8a to the CPU 2.

The communication unit 8 may be one of, e.g., a LAN (Local Area Network) card, a MODEM and a dialup router. The LAN card is inserted into a slot in the PC 1. The MODEM may be of a type of being built in the PC 1 or attached outside.

The sound output unit 9b generates analog sound waveforms from the sound data and outputs the sound waveforms to the loudspeaker 9c. The sound output unit 9b is connected via an output interface 9a to the CPU 2.

FIG. 3 is the diagram showing a hardware architecture of the management server 11. The management server 11 includes a CPU 12 and a memory 13. Further, peripheral devices such as a hard disk 14, a display device 15, a keyboard 16, a pointing device 17 and a communication unit 18, are connected respective interfaces to the management server 11.

The hard disk 14 is connected via an I/O interface 14a to the CPU 12. Further, the display device 15 is connected via a display interface 15a to the CPU 12.

Moreover, the keyboard 16 is connected via an input interface 16a to the CPU 12. The pointing device 17 is connected via an input interface 17a to the CPU 12. A communication unit 18 is connected via an I/O interface 18a to the CPU 12. Configurations thereof are the same as those of the PC 1, and hence their repetitive explanations are omitted.

<Screen Layout>

FIG. 4 shows the EPG creation request screen 31. The EPG creation request screen 31 is displayed on the display device 5 when the PC 1 accesses the management server 11. The user sets predetermined items on this screen and is thereby able to restrict contents listed up in the EPG. Namely, the EPG creation request screen 31 provides a function of setting filtering conditions.

As shown in FIG. 4, on the EPG creation request screen 31, a title "EPG world" is displayed in an uppermost area of the screen, three items of filtering conditions are displayed under the title, and a "Creation" button is displayed in a lower area of the screen.

Among the three items of filtering conditions, the first filtering condition is "Which category of data do you desire for?". Options prepared for this filtering condition are "Sound", "Animated image", "Still image", "Text" and "Unspecified".

If the user specifies "sound", URLs for indicating the contents containing the sounds are collected, thereby creating the EPG. Further, if the user specifies "Animated image", the contents containing the animated images are collected. Moreover, if the user specifies "Still image", the contents containing the still images are collected. Similarly, if the user specifies "Text", the contents containing the texts are collected.

If the user selects "Unspecified", all items of data are targets for collection. The user may specify a combination of a plurality of options excluding "Unspecified".

The second filtering condition among the three filtering conditions is "What is a genre?". Options prepared for the second filtering condition is "News", "Movie", "Music" and "Unspecified".

When the user specifies one of these genres, the URLs tracing to the contents contained in this specified genre are collected. The user may specifies a combination of a plurality of options excluding "Unspecified".

The last of the three filtering conditions is "Is a keyword specified?". Options prepared for the last filtering condition are "Specified" and "Unspecified". If the user selects "Specified", the user may specify a keyword. With this keyword specified, the URLs tracing to the contents presumed to be related to this keyword are collected.

The content related to the keyword implies what this keyword is contained in a site name of a content provider site or in a content title name contained in link information to the content.

The user, after setting those conditions, presses the "Creation" button by use of the pointing device 7, the management server 11 starts searching the URLs and creating the EPG.

FIG. 5 shows the example of the EPG display screen 32 displayed on the PC 1. This EPG is created in an HTML format on the management server 11. The browser running on the PC 1 accesses the management server 11 and gets the EPG display screen 32 displayed thereon.

The EPG display screen 32 contains, sequentially from the upper area of the screen, the title, a filtering condition display field 33, an EPG display box 34, an advertisement display box 36 and a "From-beginning reproduction" button 37.

The title "RPG world" and the filtering condition display field 33 are displayed in the upper area of the screen. The filtering conditions set on the EPG creation request screen 31 shown in FIG. 4, are displayed in the filtering condition display field 33.

The EPG display box 34 is configured by a combination of a plurality of content columns 35. Each content column 35 indicates a reproduction time of each content, a reproduction period thereof, a site title name of the content and a URL.

The reproduction time of each content is displayed such as 00:00~00:10. "00:00" indicates 0 past 0. This time is a relative time wherein an arbitrary reproduction start time is set at 00:00.

The user may, however, sets this time coincident with a real time by using an unillustrated environment setting function. With this function, the browser reproduces consecutively the contents described in the EPG, synchronizing with the real time. Further, the user may also display the reproduction time to the second by using the unillustrated environment setting function.

The reproduction period is displayed such as 00:15. "00: 15" indicates that the reproduction period is 0 hour and 15 minutes. The user may also display the reproduction period to the second by using the unillustrated environment setting function.

The reproduction period is what is obtained from the content pointed by the URL when the management server 11 searches the respective URLs.

The user may set the reproduction periods for the text and the still image by the unillustrated environment setting function. A setting time for the text is set such as 5 sec/line. The text is thereby displayed by scrolling at a speed of 5 sec/line. A setting time for the still image is set such as 60 sec/frame. A frame of still image is thereby displayed for 60 seconds.

The site title name of the content is a name of the site for providing the content concerned. Referring to FIG. 5, for example, "News Today" and "International Today" are displayed.

A banner advertisement is displayed in the advertisement display box 36. The management server 11 distributes the banner advertisement in accordance with a contract with the customer.

In a state where the EPG describe above is displayed, the user, when pressing the "From-beginning reproduction" button by the pointing device 7, the contents start being reproduced from the content set at 00:00. During the reproduction of the content, an enhanced pattern 38 for showing an on-reproducing state is displayed over the content display column 35.

<Data Structure>

FIG. 6 shows the example of data structure of the orientation database 21. The management server 11 uses the orientation database 21 in order to search the content provider site to which it has a first access.

Each record of the orientation database 21 consists of pieces of data in an "Item number" field, a "Server URL" field, a "Site title name" field, a "Content genre" field and a "Main data category" field.

The item number is a serial number for identifying each record. The server URL is an URL for indicating the content provider site. The site title name is a name of the content provider site. The content genre is a genre of the content concerned such as news, movie, music etc. The main data category is a type of the content concerned such as voices, sounds, animated image etc.

FIG. 7 shows the example of data structure in the content judgement table for judging the content. The management server 11, when searching the URLs, uses the content judgement table for judging a data category of the content indicated by the URL.

The management server 11 judges the data category of the content that is retained in its file from an extension (suffix) of the file name of the file containing the content indicated by the searched URL. For example, if a file name is given such as xxxx.mpg, the management server 11 judges that the content is an MPEG formatted animated image.

For making such a judgement, the content judgement table is structured of an "Extension" field, a "Data category" field and a "Format" field. The "Extension" field has extensions of file names of the files containing the contents. The extensions are, e.g., .au, .snd, .aif, .wav, .mp3 that are related to the sounds, mpg, mpg, .qt, .mov, avi that are related to the animated images, .jpg, .tif, .xbm, .pdf, .pcx, .pct that are related to the still images, .txt related to the text, .html., .xml that are related to the documents, and .doc., .jtd that are related to document creation applications.

The "Data category" field has categories of the data retained in the files of which the file names include the extensions. The data categories are, for instance, the sound, the animated image, the still image, the text and the document. The "Format" field has-data formats of the contents.

<Functions and Effects>

FIG. 8 shows processing steps of the EPG creation program executed by the CPU 12 in the management server 11. On the EPG creation request screen 31 of the PC 1, the management server 11, when detecting an event of pressing the "Creation" button, executes the EPG creation program.

In this process, the CPU 12 of the management server 11, to start with, reads a piece of user input information, i.e., a filtering condition on the EPG creation request screen 31 (S1) Next, the CPU 12 searches the orientation database 21. Then, the CPU 12 searches a web page of the content provider site coincident with the filtering condition (S2, search/readout of server information).

Subsequently, the CPU 12 searches a URL from the HTML file describing the web page (S3). Next, the CPU 12 registers the searched URL in the EPG (s4).

Then, the CPU 12 judges whether or not a next item of data is left in the orientation database 21 (S5).

If the next item of data remains in the orientation database 21, the CPU 12 loops the control back to S2. Whereas if the next item of data does not remain in the orientation database 21, the CPU 12 creates the EPG in a web page format(S6). Further, in this case, a predetermined advertisement in the advertisement database 22 is incorporated into the web page.

Note that a creation sequence of the EPG by use of the URLs obtained by the search process, i.e., a sequence of reproduction/display process of the content data may be set as a sequence of the URLs obtained or may be determined by a random process. This sequence may be determined otherwise, e.g., by a predetermined sorting sequence.

Next, the CPU 12 distributes the created EPG to the client (S7). Thereafter, the CPU 12 finishes the processing of the EPG creation program.

FIG. 9 shows details of the URL search process. In this process, the CPU 12 at first judges whether it is time-over or not (S30). If judged to be time-over, the CPU 12 finishes the processing.

Whereas if judged not to be time-over, the CPU 12 reads a link destination of the HTML file describing the web page of the content provider site (S31).

Next, the CPU 12 judges whether or not there is a further link next to that link destination (S32). If the next link exists, the CPU 12 executes a recursive call of the URL search process. The URL search process is thereby executed with respect to the further link destination next to the former link destination. Thereafter, the CPU 12 advances the control to S37.

While on the other hand, if judging in S32 that there is not the next link destination, the CPU 12 judges whether or not the file of the link destination is a file that has been defined in a content definition table (S34).

If the file of the link destination is judged not to be the file defined in the content definition table, the CPU 12 advances the control to S37. If the file of the link destination is judged to be the file defined in the content definition table, the CPU 12 judges whether or not the file of the link destination is coincident with the filtering condition (S35).

If the file of the link destination is not coincident with the filtering condition, the CPU 12 advances the control to S37. If coincident with the filtering condition, the CPU 12 saves the reproduction period of the content and the site title name in the memory 13 (S36).

Next, the CPU 12 judges whether or not the HTML file which is being searched at the present has a next link destination (S37). If there is the next link destination, the CPU 12 loops the control back to S31. Whereas if the next link destination does not exist, the CPU 12 finishes the URL search process.

FIG. 10 shows steps of a content auto reproduction process based on the relative time. This function is provided as a browser function on the PC 1. When the user gives an EPG auto reproduction command during an execution of the browser, the CPU 2 of the PC 1 executes the process in FIG. 10.

In this process, the CPU 2, to begin with, judges whether or not the content is being reproduced (S100). Whether the content is being reproduced or not is clearly shown in a predetermined state register. If the content is in the process of being reproduced, the CPU 2 waits till the reproduction is ended.

Whereas if not in the process of being reproduced, the CPU 2 judges whether or not an indication of end is given from the user (S101). If given the indication of end, the CPU 2 finishes the content auto reproduction process.

Whereas if not given, the CPU 2 reads a next URL in the EPG (S102). Herein, the "next URL" is a URL described in a column next to the content column 35 (see FIG. 5) in the EPG which indicates the content in the process of being reproduced at the present.

Next, the CPU 2 records an on-EPG position of the content column 35 of the content in the process of being reproduced (S103) This position is used for searching a next content.

Subsequently, the CPU 2 judges whether or not a category of the content indicated by the URL (read out in S102) is the sound (including the vocal sounds and music). If the indicated content is categorized as the sound, the CPU 2 requests a sound reproduction program to reproduce the sound (S105). This request is to request a decoder to decode, e.g., MP3 data. Thereafter, the CPU 2 loops the control back to S100.

Whereas if the category of the content indicated by the URL concerned is not the sound, the CPU judges whether the category of the content is the animated image or not (S106). If categorized as the animated image, the CPU 2 requests a animated image reproduction program to reproduce the animated image (S107). This request is to request the decoder to decode, e.g., MPEG data. Thereafter, the CPU 2 loops the control back to S100.

Whereas if the category of the content indicated by the same URL is not the animated image, the CPU 2 judges whether or the category of the content is the still image or not (S108). If the content is the still image, the CPU 2 requests a still image display program to display the image for a predetermined time (S109).

Thereafter, the CPU 2 returns the control to S100. If the still image is based on, e.g., a JPEG format, the decoder is requested to decode JPEG data, and the decoded data are displayed for a predetermined period of time.

If the content indicated by the URL is not the still image, the CPU 2 judges whether the category of the content is the document or not (S110). If judged to be the document, the CPU 2 requests a document program to display the document for a predetermined time (S111). Thereafter, the CPU 2 loops the control back to S100. With this process, for instance, the text and the image are displayed by scrolling at a predetermined speed.

If the content indicated by the URL is not the document, the CPU 2 returns the control directly to S100.

FIG. 11 is a flowchart showing the content auto reproduction process synchronizing with a real time. When the user gives a command of an EPG auto reproduction after setting to synchronize the EPG time with the real time by use of the unillustrated environment setting function, processes shown in FIG. 11 are executed.

The processes in FIG. 11 are substantially the same as those in FIG. 10 excluding S102a and S103a. Such being the case, the same processes are marked with the same symbols, and their repetitive explanations are omitted.

The present content reproduction process is ended, and, if the user does not give the indication of end, the CPU 2 obtains the present time from a timer (S102a).

Next, the CPU 2 searches from the EPG a content scheduled to be reproduced in the vicinity of the present time. This is attained by obtaining the content column 35 (see FIG. 5) of the content that starts being reproduced within a time range with an error on the order of 30 sec from the present time. The thus obtained content indicated by the URL is reproduced in the same way as in the case of FIG. 10 (S104 through Sill).

As discussed above, according to the information search system in the first embodiment, the management server 11 collects the URLs tracing to the contents retained by the content severs or the management server 11 itself in the network, then creates the EPG and distributes the EPG to the client. The client is able to reproduce or display the contents on the network in accordance with this EPG as if receiving a TV and a radio.

Further, on the occasion of creating the EPG, the user is able to specify the desired data category, genre and filtering condition based on the keyword, and to create the EPG coincident with this condition.

<Modified Example>

[Modification of Hardware Architecture]

The information search system in the first embodiment involves the use of the personal computer as the client. The personal computer may be of a notebook type or a desktop type.

Further, the client may be one of a mobile information terminal that is a so-called PDA (Personal Digital Assistants), a mobile telephone, a digital TV, a set-top box to which a TV monitor is connected, and so on.

[Modification of Data Format]

In the first embodiment, the EPG is described in the HTML format. The embodiment of the present invention is not, however, limited to the procedures defined by the HTML. The EPG may be described by, for example, XML (Extensible Markup Language). Further, the EPG may also be described in a plain text format, a sheet format of a spreadsheet program, and a document format of a word processor program, for example, a document file format of Word by Microsoft Corporation, U.S.A.

In the first embodiment, the management server 11 searches the HTML describing the web page of the content provider site and further searches the URL for indicating the content. The embodiment of the present invention is not, however, confined to such procedures. For instance, the management server 11 may search the data described by the XML and further search the URL to the content.

Moreover, the management server 11 may search the HTML simplified for the mobile telephone, e.g., the HTML corresponding to i-mode services provided by NTT DoCoMo Co., Ltd.

[Time-Out Process]

According to the EPG creation program in the first embodiment, the CPU 12 judges whether it is time-out or not, and finishes the URL search process. The embodiment of the present invention is not, however, limited to the process described above. The user may specify, for example, a maximum search count, a maximum search page count or a maximum search content count, and the search may be finished just when one of these count values is reached in the search process.

Further, the URL search process may also be ended with an event by the user instead of the time-out process. For attaining this end mode, an "End" button is provided on the unillustrated browser screen, and there may be detected a manipulation of pressing this button by the pointing device 7. When the "End" button is pressed, the browser may notify the program for executing the processes in FIG. 9 that the "End" button has been pressed. Then, for instance, in the process in S30 shown in FIG. 9, it may be judged whether the "End" button is pressed or not instead of making the time-out judgement.

[Content Data Category Judging Method]

The data category is judged from the extension of the file name of the file that retains the content by use of the content judgement table shown in FIG. 7 in the first embodiment. The embodiment of the present invention is not, however, limited to the structure and procedures described above. For example, a file header of the file that retains the content is read, and the data category may be judged from the header information thereof.

Second Embodiment

Figure 12:
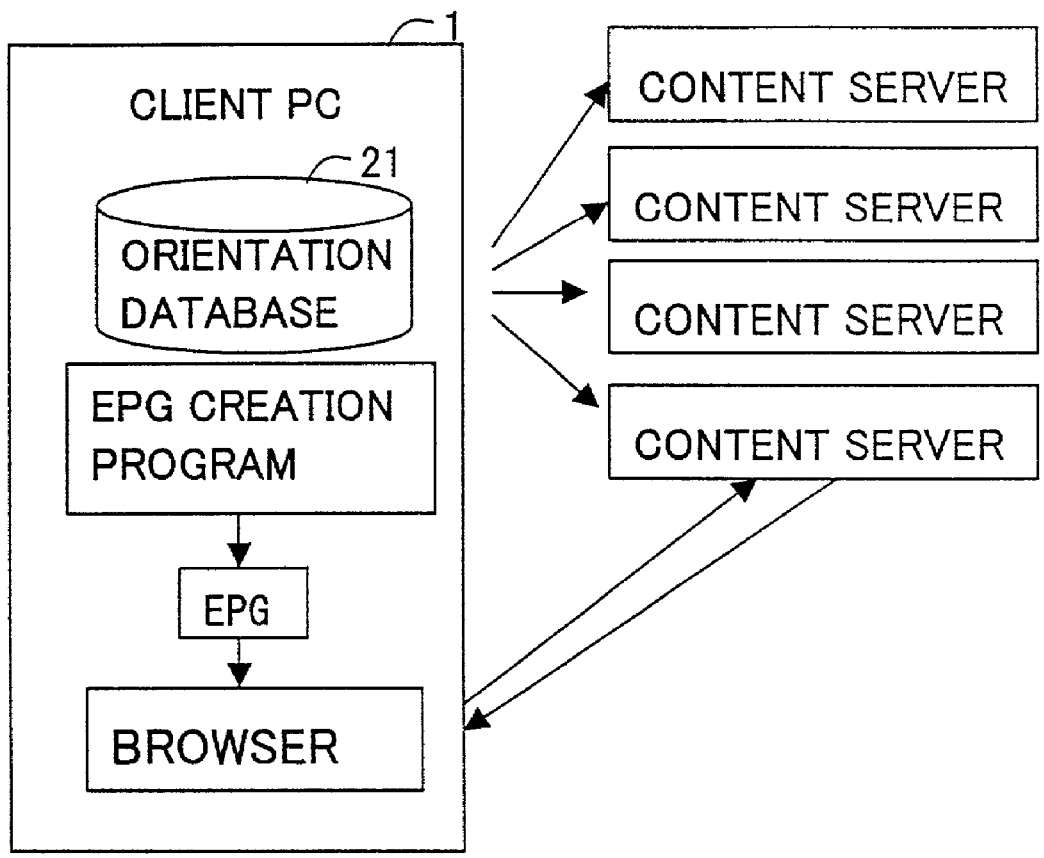
FIG. 12 is a diagram showing an outline of system architecture of the information search system in a second embodiment.
Figure 13:
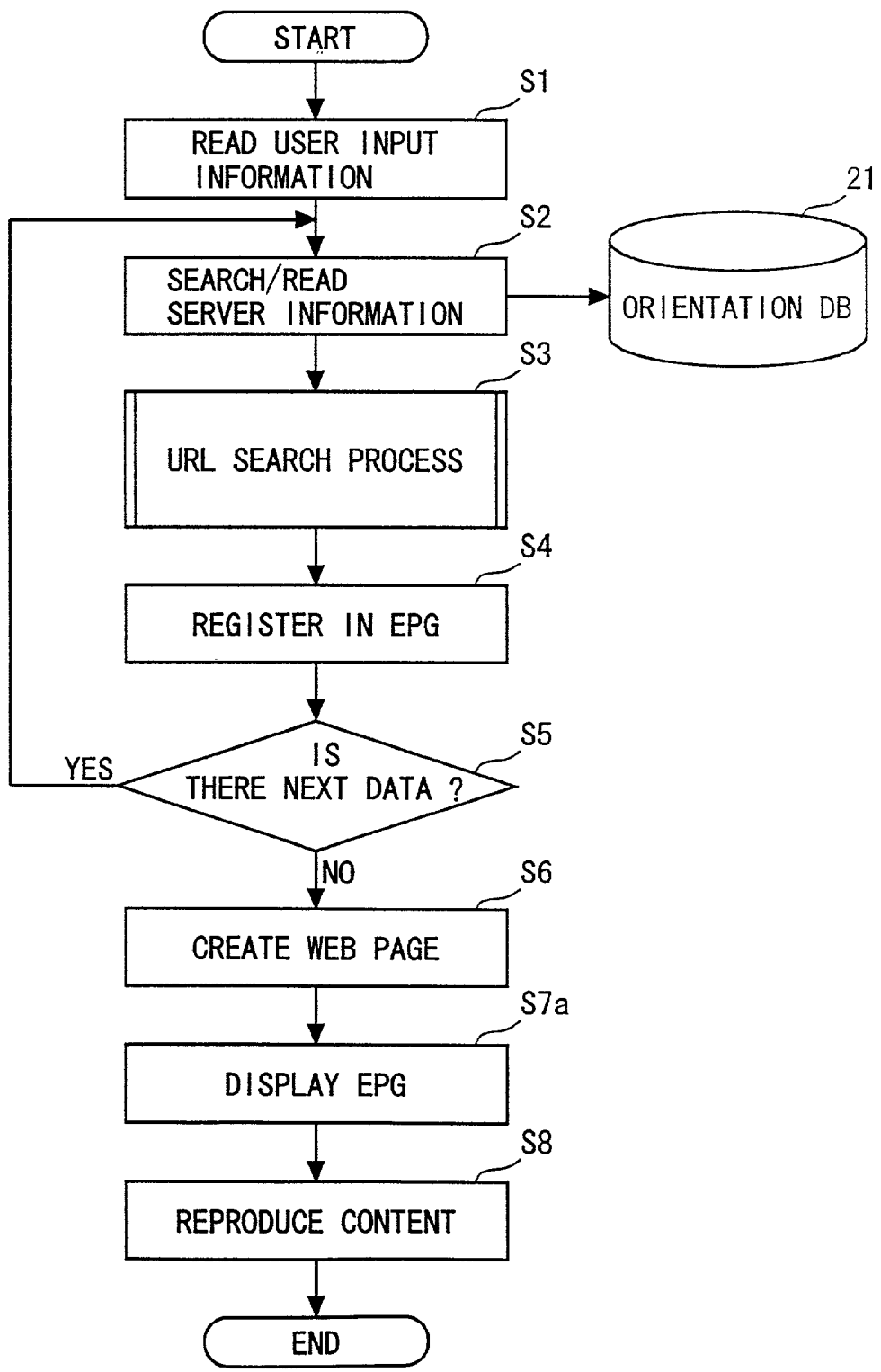
FIG. 13 is a flowchart showing processes of the EPG creation program in the second embodiment.

A second embodiment of the present invention will be described with reference to FIGS. 12 and 13. FIG. 12 is a diagram showing an outline of a system architecture of the information search system in the second embodiment. FIG. 13 is a flowchart showing processes of the EPG creation program executed by the PC 1 shown in FIG. 12.

In the first embodiment, the management server 11 searches the URL indicating the content on the network and creates the EPG in response to the client request.

According to the information search system in the second embodiment, the PC 1 defined as the client executes the EPG creation program. The PC 1 then creates the EPG, and reproduces and displays the content. Other configurations and functions are the same as those in the first embodiment. Then, the same components are marked with the same numerals, and their repetitive explanations are omitted.

FIG. 12 shows the outline of the system architecture of the information search system in the second embodiment. In the second embodiment, the PC 1 as the client has the orientation database 21. Further, the PC1 executes the same EPG creation program as that of the management server 11 in the first embodiment.

Then, the PC 1, based on the orientation database 21, searches the content servers on the network or its own data base, thereby creating the EPG. The browser, to which this EPG is transferred, reproduces the content in accordance the EPG.

FIG. 13 shows the processes of the EPG creation program executed by the PC 1. This program is executed as one of the browser functions or as a function of controlling the browser. The processes in S1 through S6 of this program are the same as those of the EPG creation program in the first embodiment, and the repetitive explanations thereof are omitted.

In the second embodiment, the PC 1 generates the EPG in the web page format and thereafter displays the EPG (S7a). The user, based on the RPG displayed, gets the content reproduced or displayed. The user may command the browser to consecutively output the contents in accordance with the EPG.

As discussed above, according to the information search system in the second embodiment, the client executes the EPG creation program. Accordingly, the client is capable of searching the URL for indicating the content and creating the EPG without accessing the management server 11.

<<Readable-by-Computer Recording Medium>>

The program of the management server 11 or the client in the embodiments discussed above may be recorded on a readable-by-computer recording medium. Then, a computer reads the program from this recording medium and executes the same program, thereby functioning as the management server 11 or the client exemplified in the embodiments discussed above.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the above program may be stored in the hard disk and the memory of the computer, and downloaded to other computers via communication media. In this case, the program is transmitted as data communication signals embodied in carrier waves via the communication media. Then, the computer downloaded with this program can be made to function as the management server 11 or the client in the embodiments discussed above.

Herein, the communication media may be any one of cable communication mediums such as metallic cables including a coaxial cable and a twisted pair cable, optical communication cables, or wireless communication media such as satellite communications, ground wave wireless communications, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be anyone of a modulated broadband signal and an unmodulated base band signal (corresponding to a case of setting a DC signal having a voltage of 0 as a carrier wave).

What is claimed is:

1. An information processing system comprising;
   a storage unit storing information; and
   a control unit comprising:
      a locating information identifying unit searching information specifying a data store destination storing locating information for locating where data exists and, in response to the searching, identifying locating information in the data store destination;
      a searching unit searching said identified locating information in said data store destination;
      an extracting unit extracting a file identifier indicating one of a plurality of categories of data in a data file containing the data located by said locating information;
      a judging unit judging whether the data located by the locating information comes under a predetermined category based on said file identifier indicating one of a plurality of categories of data in said data file containing the data;
      a storage unit storing the locating information to collect pieces of locating information for locating where the data exist when the data is judged to come under the predetermined category;
      a sequence determining unit determining a sequence of reproducing a content data searched based on predetermined parameters set by a user and a reproduction time of the content data;
      a reproduction control unit controlling a reproduction of the content data in accordance with the reproducing sequence; and
      an output interface connectable to an output unit,
      wherein the reproduction of the content data is outputted to the output unit connected to the output interface.

2. An information processing system according to claim 1, further comprising a communication unit for accessing a network, or a communication connection module through which said communication unit is connected, wherein said control unit searches the locating information retained in other information processing system on the network.

3. An information processing system according to claim 2, wherein said communication unit receives a selection criterion for selecting the data and said control unit judges whether or not the data is coincident with the selection criterion and collects pieces of locating information tracing to the data coincident with the selection criterion.

4. An information processing system according to claim 2, wherein said communication unit receives a request for collecting the locating information from a terminal device connected to the network, and said control unit gets the collected locating information displayed on said terminal device.

5. An information processing system according to claim 4, wherein said control unit searches character information related to the data, and gets the character information displayed in a way of being combined with the locating information.

6. An information processing system according to claim 1, further comprising an input unit, wherein said input unit receives an input of the selection criterion for selecting the data, and said control unit judges whether or not the data is coincident with the selection criterion and collects pieces of locating information tracing to the data coincident with the selection criterion.

7. An information processing system according to claim 1, further comprising a display unit for displaying the information, or a first connection module through which said display unit is connected, wherein said control unit gets the collected locating information displayed on said display unit.

8. An information processing system according to claim 1, wherein categories of the data are still image data, sound data, animated image data, text data, or combinations thereof.

9. An information processing system according to claim 1, further comprising;
   an input unit;
   a display unit displaying information, or a first connection module through which said display unit is connected; and
   a sound output unit outputting sounds, or a second connection module through which said sound output unit is connected,
   wherein said control unit, when commanded to output the data via said input unit, gets the content described by the data outputted to said display unit or said sound output unit.

10. An information processing system according to claim 9, wherein said control unit gets a plurality of contents consecutively outputted, which are located by plural pieces of locating information collected.

11. A computer system comprising:
   a communication unit accessing a network; and
   a computer processor programmed by programming modules to control the system, the programming modules comprising:
      a communication connection module through which said communication unit connects the system to the network;
      a locating information identifying unit searching information specifying a data store destination storing locating information for locating where data exists and, in response to the searching, identifying locating information in the data store destination;
      a searching unit searching said identified locating information in said data store destination;
      an extracting unit extracting a file identifier indicating one of a plurality of categories of data in a data file containing the data located by said locating information;
      a judging unit judging whether the data located by the locating information comes under a predetermined category based on said file identifier indicating one of a plurality of categories of data in said data file containing the data;

a storage unit storing a list of the data judged to come under a predetermined category as a condition of the data;

a sequence determining unit determining a sequence of reproducing a content data searched based on predetermined parameters set by a user and a reproduction time of the content data;

a reproduction control unit controlling a reproduction of the content data in accordance with the reproducing sequence; and an output interface connectable to an output device, wherein the reproduction of the content data is outputted to the output device connected to the output interface.

12. A system according to claim 11, wherein the content data are retained in other system accessible via a network.

13. A system according to claim 11, wherein the predetermined condition is specified by a user.

14. A system according to claim 11, wherein the predetermined condition is to specify a specific genre of the content.

15. A system according to claim 11, wherein the predetermined condition is to specify a specific data category.

16. A system according to claim 11, wherein the content data are stream data.

17. A method of collecting locating information for indicating a location of data, comprising:

searching information specifying a data store destination storing locating information to locate where data exists;

in response to the searching, identifying locating information in the data store destination;

searching the identified locating information in the data store destination for locating where data exists;

extracting a file identifier indicating one of a plurality of categories of data in a data file containing the data located by said locating information;

judging whether the data located by the locating information comes under a predetermined category based on the file identifier indicating one of a plurality of categories of data in the data file including the data;

storing, when judging that the data comes under the predetermined category, the locating information;

determining a sequence of reproducing the data located by the stored locating information based on predetermined parameters set by a user and a reproduction time of the content data;

controlling reproduction of the data in accordance with the determined reproducing sequence; and outputting the reproduction of the data to the user.

18. A method according to claim 17, further comprising accessing a network, wherein the data are stored in an information processing system on the network.

19. A method according to claim 18, further comprising: receiving a selection criterion for selecting the data; and judging whether or not the data is coincident with the selection criterion, wherein pieces of locating information tracing to the data coincident with the selection criterion are collected.

20. A method according to claim 17, further comprising: receiving specification of a selection criterion for selecting the data; and judging whether or not the data is coincident with the selection criterion, wherein pieces of locating information tracing to the data coincident with the selection criterion are collected.

21. A method according to claim 17, further comprising generating display information for getting the collected locating information displayed.

22. A method according to claim 21, further comprising searching character information related to the data, wherein the character information is displayed in a way of being combined with the locating information.

23. A method according to claim 17, further comprising displaying the collected locating information.

24. A method according to claim 17, wherein categories of the data are still image data, sound data, animated image data, text data, or combinations thereof.

25. A method according to claim 17, further comprising: selecting the data indicated by the locating information; giving a command to output the data; and outputting the content described by the data.

26. A method according to claim 17, further comprising: searching the data indicated by the locating information; outputting the content described by the data; and repeating the searching and the outputting with respect to plural pieces of locating information collected.

27. A content data searching method on a network comprising:

searching information specifying a data store destination storing locating information to locate where data exists;

in response to the searching, identifying locating information in the data store destination;

searching, in the identified locating information of the data store destination, judged content data coincident with a predetermined condition based on an extracted file identifier indicating one of a plurality of categories of data in a data file containing the content data on the network;

storing a list of the data searched based on the file identifier in the data file;

determining a sequence of reproducing the content data searched based on predetermined parameters set by a user and a reproduction time of the content data;

controlling reproduction of the content data in accordance with the reproducing sequence; and outputting the reproduction of the content data to the user.

28. A computer readable storage medium, tangibly embodying a program of instructions executable by the computer to perform functions comprising:

searching information specifying a data store destination storing locating information to locate where data exists;

in response to the searching, identifying locating information in the data store destination;

searching the identified locating information in the data store destination for locating where data exists;

extracting a file identifier indicating one of a plurality of categories of data in a data file containing the data located by said locating information;

judging whether the data comes under a predetermined category based on the file identifier indicating one of a plurality of categories of data in the data file including the data;

storing, when judging that the data comes under the predetermined category, the locating information to collect the locating information for indicating the locations of the data;

determining a sequence of reproducing the data located by the stored locating information based on predetermined parameters set by a user and a reproduction time of the content data;

controlling reproduction of the data in accordance with the determined reproducing sequence; and outputting the reproduction of the data to the user.

29. A computer readable storage medium tangibly embodying a program according to claim 28, of instructions executable by a computer, further comprising accessing a network, wherein the data are stored in an information processing system on the network.

30. A computer readable storage medium tangibly embodying a program according to claim 29, of instructions executable by a computer, further comprising:
receiving a selection criterion for selecting the data; and
judging whether or not the data is coincident with the selection criterion,
wherein pieces of locating information tracing to the data coincident with the selection criterion are collected.

31. A computer readable storage medium tangibly embodying a program according to claim 28, of instructions executable by a computer, further comprising:
accepting a input of selection criterion for selecting the data; and
judging whether or not the data is coincident with the selection criterion,
wherein pieces of locating information tracing to the data coincident with the selection criterion are collected.

32. A computer readable storage medium tangibly embodying a program according to claim 28, of instructions executable by a computer, further comprising generating display information for getting the collected locating information displayed.

33. A computer readable storage medium tangibly embodying a program according to claim 32, of instructions executable by a computer, further comprising searching character information related to the data,
wherein the character information is displayed in a way of being combined with the locating information.

34. A computer readable storage medium tangibly embodying a program according to claim 28, of instructions executable by a computer, further comprising displaying the collected locating information.

35. A computer readable storage medium tangibly embodying a program according to claim 28, wherein categories of the data are still image data, sound data, animated image data, text data, or combinations thereof.

36. A computer readable storage medium tangibly embodying a program according to claim 28, of instructions executable by a computer, further comprising:
accepting a selection of the data indicated by the locating information;
accepting a command to output the data; and
outputting the content described by the data.

37. A computer readable storage medium tangibly embodying a program according to claim 28, of instructions executable by a computer, further comprising:
searching the data indicated by the locating information;
outputting the content described by the data; and
repeating steps of searching and outputting with respect to plural pieces of locating information collected.

38. A computer readable storage medium, tangibly embodying a program of instructions executable by a computer to perform functions comprising:
searching information specifying a data store destination storing locating information to locate where data exists;
in response to the searching, identifying locating information in the data store destination;
searching, in the identified locating information of the data store destination, judged content data coincident with a predetermined condition based on an extracted file identifier indicating one of a plurality of categories of data in a data file containing the content data;
determining a sequence of reproducing the content data searched based upon the file identifier indicating one of a plurality of categories of data in the data file and predetermined parameters set by a user and a reproduction time of the content data;
controlling a reproduction of the content data in accordance with the reproducing sequence; and
outputting the reproduction of the content data to the user.

39. An information processing system comprising:
a storage unit storing information; and
a control unit comprising;
a locating information identifying unit searching information specifying a data store destination storing locating information for locating where data exists and, in response to the searching, identifying locating information in the data store destination;
a searching unit searching said identified locating information in said data store destination;
an extracting unit extracting a file identifier indicating one of a plurality of categories of data and included in a file name of a data file including the data from said locating information; and
a judging unit judging whether the data located by the locating information comes under a predetermined category based on said file identifier of said file name indicating one of a plurality of categories of data,
a storage unit storing the locating information to collect pieces of locating information for locating where the data exist when the data is judged to come under the predetermined category;
a sequence determining unit determining a sequence of reproducing a content data searched based on predetermined parameters set by a user and a reproduction time of the content data;
a reproduction control unit controlling a reproduction of the content data in accordance with the reproducing sequence; and
an output interface connectable to an output unit,
wherein the reproduction of the content data is outputted to the output unit connected to the output interface.

40. A computer system comprising:
a communication unit accessing a network, and
a computer processor programmed by program modules to control the computer system, the program module comprising:
a communication connection module through which said communication unit connects the system to the network;
a locating information identifying unit searching information specifying a data store destination storing locating information for locating where data exists and, in response to the searching, identifying locating information in the data store destination;
a searching unit searching said identified locating information in said data store destination;
an extracting unit extracting a file identifier included in a file name of a data file including the data from said locating information, the file identifier indicating one of a plurality of categories of data; and
a judging unit judging whether the data located by the locating information comes under a predetermined category based on said file identifier of said file name indicating one of a plurality of categories of data;
a storage unit storing a list of the data judged to come under a predetermined category;

a sequence determining unit determining a sequence of reproducing a content data searched based on predetermined parameters set by a user and a reproduction time of the content data;

a reproduction control unit controlling reproduction of the content data in accordance with the reproducing sequence; and an output interface connectable to an output device, wherein the reproduction of the content data is outputted to the output device connected to the output interface.

41. A method of collecting locating information for indicating a location of data, comprising:

searching information specifying a data store destination storing locating information to locate where data exists;

in response to the searching, identifying locating information in the data store destination;

searching the identified locating information in the data store destination for locating where data exists;

extracting a file identifier included in a file name of a data file including the data from said locating information, the file identifier indicating one of a plurality of categories of data;

judging whether the data comes under a predetermined category based on the file identifier included in the file name of the data file containing the data and indicating one of a plurality of categories of data;

storing, when judging that the data comes under the predetermined category, the locating information;

determining a sequence of reproducing the data located by the stored locating information based on predetermined parameters set by a user and a reproduction time of the content data;

controlling reproduction of the data in accordance with the determined reproducing sequence; and outputting the reproduction of the data to the user.

42. A content data searching method on a network comprising:

searching information specifying a data store destination storing locating information to locate where data exists;

in response to the searching, identifying locating information in the data store destination;

searching, in the identified locating information of the data store destination, a content data coincident with a predetermined condition based on a file identifier included in a file name of a data file containing the content data on the network, the file identifier indicating one of a plurality of categories of data;

storing a list of the data searched based upon the file identifier included in the file name of the data file and indicating one of a plurality of categories of data;

determining a sequence of reproducing the content data searched based on predetermined parameters set by a user and a reproduction time of the content data;

controlling a reproduction of the content data in accordance with the reproducing sequence; and outputting the reproduction of the content data to the user.

43. A computer readable storage medium, tangibly embodying a program of instructions executable by a computer to perform functions comprising:

searching information specifying a data store destination storing locating information to locate where data exists;

in response to the searching, identifying locating information in the data store destination;

searching the identified locating information of the data store destination for locating where data exists;

extracting a file identifier included in a file name of a data file including the data from said locating information, the file identifier indicating one of a plurality of categories of data;

judging whether the data comes under a predetermined category based on the file identifier included in the file name of the data file containing the data and indicating one of a plurality of categories of data;

storing, when judging that the data comes under the predetermined category, the locating information to collect the locating information for indicating locations of the data;

determining a sequence of reproducing the data located by the stored locating information based on predetermined parameters set by a user and a reproduction time of the content data;

controlling reproduction of the data in accordance with the determined reproducing sequence; and outputting the reproduction of the data to the user.

44. A computer readable storage medium, tangibly embodying a program of instructions executable by a computer to perform functions comprising:

searching information specifying a data store destination storing locating information to locate where data exists;

in response to the searching, identifying locating information in the data store destination;

searching, in the identified locating information of the data store destination, judged content data coincident with a predetermined condition based on an extracted file identifier included in a file name of a data file containing the content data, the file identifier indicating one of a plurality of categories of data;

determining a sequence of reproducing the content data searched based on predetermined parameters set by a user and a reproduction time of the content data; and controlling a reproduction of the content data in accordance with the reproducing sequence; and outputting the reproduction of the content data to the user.

45. A method of operating a data processing system, comprising:

receiving from a user, a request for an electronic program guide, the request including filtering information;

in response to receiving the request, searching a content provider site to identify a location associated with a content file;

searching the identified location to determine that a characteristic of the content file corresponds with the filtering information;

extracting a file identifier indicating one of a plurality of categories of data in the content file containing the data;

judging whether the data comes under a predetermined category based on the file identifier;

determining a sequence of reproducing the content file searched based on predetermined parameters set by a user and a reproduction time of the content data;

controlling reproduction of the content file in accordance with the reproducing sequence;

generating an electronic program guide that includes the location; and outputting the reproduction of the content file to the user.

46. The method of claim 45, further comprising selecting a content provider site to search according to the filtering information.

47. The method of claim 45, wherein the characteristic is a file name extension.

48. A method of collecting locating information for indicating a location of data, comprising:

extracting a file identifier indicating one of a plurality of categories of data in a data file containing the data located by searching identified locating information in a data store destination, the identified locating information identified in response to searching information specifying the data store destination storing locating information for locating where data exists;

judging whether the data comes under a predetermined category based on the file identifier;

storing the locating information in a sequence, the locating information correlating to predetermined file identifier indicating one of a plurality of categories of file identifiers in the extracting, the sequence based on predetermined parameters set by a user and a reproduction time of the content data;

reproducing the data in accordance with the determined reproducing sequence; and outputting the reproduced data to the user.

49. An information processing method comprising:

judging whether data located by a locating information comes under a predetermined category based on a file identifier when extracting the file identifier indicating one of a plurality of categories of data in a data file containing the data located in said locating information by searching identified locating information in the data store destination when searching information specifying a data store destination which stores said locating information where data exists;

storing the locating information to collect pieces of locating information for locating where the data exist when the data is judged to come under the predetermined category;

controlling a reproduction of the content data based on the reproducing sequence that reproduces a content data searched based on predetermined parameters set by a user and a reproduction of the content data; and outputting the reproduction of the content data to the user.

\* \* \* \* \*

UNITED STATES PATENT AND TRADEMARK OFFICE
CERTIFICATE OF CORRECTION

PATENT NO. : 7,409,382 B2  Page 1 of 1
APPLICATION NO. : 09/864260
DATED : August 5, 2008
INVENTOR(S) : Toshiharu Kido It is certified that error appears in the above-identified patent and that said Letters Patent is hereby corrected as shown below:

Column 13, Line 26, change "comprising;" to --comprising:--.

Column 14, Line 30, change "comprising;" to --comprising:--.

Signed and Sealed this

Twenty-fifth Day of November, 2008

JON W. DUDAS
*Director of the United States Patent and Trademark Office*